Dec. 30, 1947.  J. J. DELANY  2,433,507
FLUSH VALVE
Filed Nov. 11, 1944
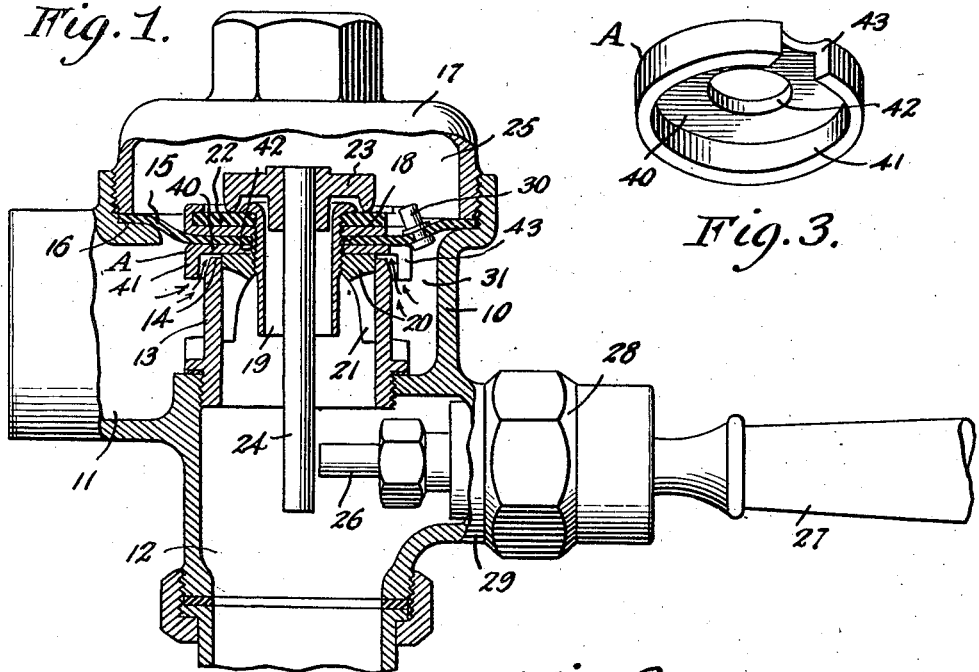
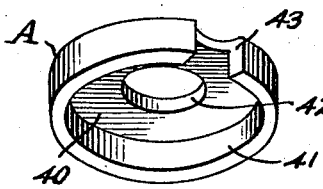
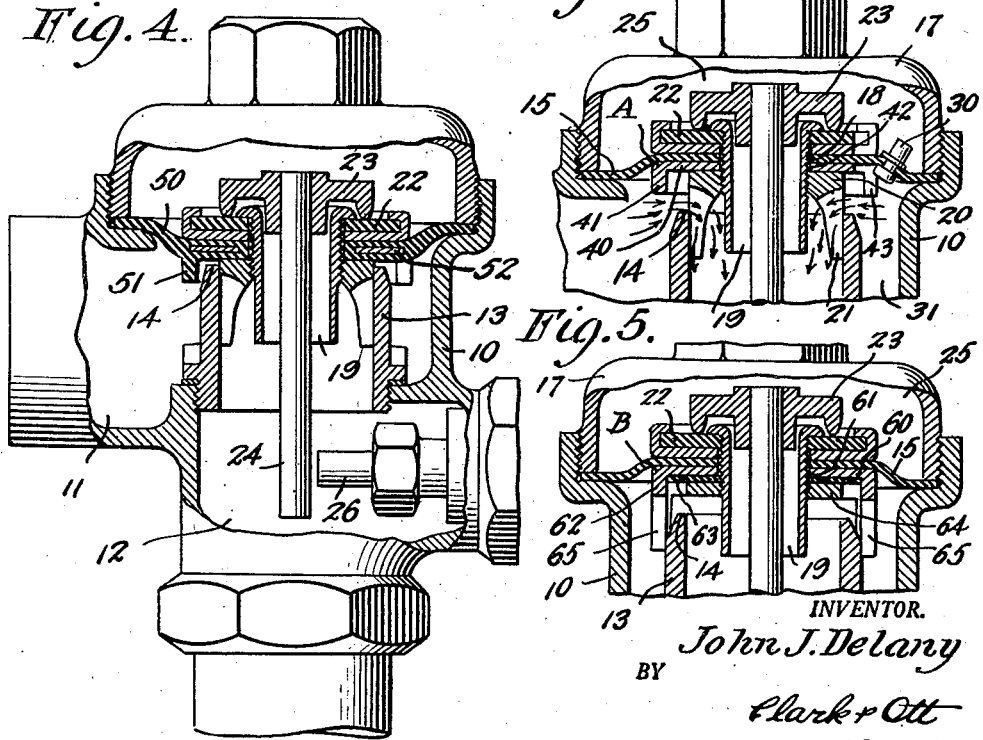
INVENTOR.
John J. Delany
BY
Clark & Ott
ATTORNEYS Patented Dec. 30, 1947

2,433,507

UNITED STATES PATENT OFFICE 2,433,507

FLUSH VALVE

John J. Delany, Brooklyn, N. Y.

Application November 11, 1944, Serial No. 562,958

1 Claim. (Cl. 137—93)

This invention relates to flush valves and is more particularly directed to means incorporated in the valve structure for effectively silencing or muffling the objectionable noise incident to the closing of the diaphragm valve with reference to its seat when discontinuing the flushing operation and this without affecting the flushing efficiency of the valve.

While many unsuccessful and impractical attempts have been made to solve this problem, a careful analysis of the matter indicates that the closing noise may be mainly attributed to the regurgitation and extreme agitation or resurgence of the water during the final stages of the movement of the diaphragm valve toward its seat, the same being the result of the direct flow of the water radially inward between the diaphragm valve and its seat.

In view of this, the present invention comprehends a silencing or muffling means of the indicated character which is moveable by and with the diaphragm valve and which is so constructed as to define a baffle moveable to a position in surrounding spaced relation to the seat of the diaphragm valve as the same approaches its seat so that it intercepts and prevents the direct flow of the water radially inward between said valve and seat thereby causing the water to flow in a tortuous path which tends to maintain a solid head of water in surrounding relation to the seat thus overcoming the regurgitation and extreme agitation and the noise incident thereto.

An outstanding advantage of the present invention resides in the provision of a silencing or muffling means which is so located or positioned within the valve structure as to avoid any interference with the primary function or purpose of a flush valve, namely its flushing action and this is particularly advantageous where the pressure and flow velocity is very low and precludes the use of silencing means such as have heretofore been used and located in the valve casing outlet or the tubular valve seat leading to said outlet where they impede the flow to such an extent as to practically destroy the flushing action.

It has also been observed that the silencing or muffling means of the present invention functions to attain a better timing of the valve operation by reducing and controlling the flexing of the diaphragm during its downward movement while the flushing operation is in progress and in one of its adaptations, the said means overlies the diaphragm and engages with the valve seat and consists of an element from which small pebbles, grit or other hard foreign particles will rebound thus avoiding embedment thereof in the diaphragm which has resulted in an improper closing of the valve after the flushing operation.

With the above enumerated and other objects in view, the invention is set forth in greater detail in the following specification, particularly pointed out in the appended claim and illustrated in the accompanying drawings, in which:

Fig. 1 is a side view of a flush valve with parts broken away and shown in section and illustrating the valve equipped with a muffling or silencing means constructed in accordance with the invention, said means being shown in its active position for muffling the closing noise.

Fig. 2 is a fragmentary vertical sectional view through the flush valve showing the diaphragm valve member in its fully opened position with the muffling or silencing means in its inactive position.

Fig. 3 is a detail perspective view of the muffling or silencing element removed from the diaphragm valve member.

Fig. 4 is a view similar to Fig. 1 illustrating a modified adaptation of the invention wherein the muffling or silencing means is formed integral with the diaphragm valve member.

Fig. 5 is a fragmentary vertical sectional view through a flush valve showing a modified form of muffler element combined with guide means for the diaphragm valve member.

Referring to the drawings by characters of reference, 10 designates the casing of a flush valve formed with the inlet and outlet openings 11 and 12, the former being defined by a lateral boss at one side of the casing and the latter by the lower end portion of said casing. A removable tubular sleeve 13 defining a valve seat 14 at its upper open end communicates with the outlet opening 12 and extends upwardly therefrom to a location adjacent the upper end of the casing. A flexible diaphragm valve member 15 which is preferably of leather has its marginal edge clamped against the internal shoulder 16 adjacent the upper end of the casing 10 by means of a cap 17 which is threadedly engaged with the upper end of the casing and the said diaphragm member 15 is formed with a central opening 18 within which is fitted and sealed the outlet tube or bushing 19 which depends from the diaphragm valve member and is clamped in place with reference thereto by a retaining nut 20 formed with depending circumferentially spaced guide fingers 21 slidably engaging within the sleeve 13 for guiding the diaphragm member 15 in its movements toward and away from the seat 14. The upper end of the outlet tube or bushing 19 is formed with a marginal bead which clamps an upper or auxiliary valve seat 22 against the upper surface of the diaphragm member 15 in surrounding relation to the central opening 18 thereof.

An upper valve element 23 having a depending actuator stem 24 normally engages the upper valve seat 21 to close an upper pressure chamber 25 defined within the cap 17 above the diaphragm member 15. The lower end of the upper valve actuator stem 24 is disposed adjacent to the terminal 26 of the oscillating handle 27 which in turn is mounted for universal oscillatory movement in a suitable water tight bearing 28 carried by the lateral boss 29 formed on the casing 10. The diaphragm valve member 15 is provided with the usual by-pass fitting 30 extending therethrough for permitting the passage of water from the lower main water chamber 31 of the casing 10 to the upper pressure chamber 25.

The foregoing description applies to the general structure of one of the conventional types of diaphragm flush valves which operate in the usual manner wherein the upper valve element 23 is first opened by manipulating the oscillating handle 27 to cant and displace said valve 23 from its seat 21 so as to permit the water to flow from the upper pressure chamber 25, thereby reducing the pressure on the upper surface of the diaphragm valve member 15 whereby the greater pressure in the lower main water chamber 31 flexes said diaphragm member upwardly away from its seat 14 as shown in Fig. 2. The water then flows from the chamber 31 through the upper end of the tubular sleeve and thence downwardly through the outlet opening 12 for accomplishing the flushing operation.

As the water gradually fills the upper chamber 25 through the by-pass fitting to equalize the pressure therein with the pressure in the lower main chamber 31, the diaphragm valve member 15 is flexed downwardly toward its seat 15. During the final stages of this movement, it is evident that the opening for the passage of the water between the diaphragm and its seat becomes more and more restricted or narrower, resulting in what may be described as a regurgitation, extreme agitation or turbulence of the water in the region adjacent to the narrowing or restricted outlet which results in the undesirable or objectionable noise incident to and immediately preceding the final closing of the diaphragm valve member. This regurgitation, agitation or turbulence has been attributed to the fact that the water under pressure increases in velocity as the outlet becomes narrower or more restricted while flowing radially inward between the diaphragm valve and its seat thus producing a high pitched whistling or hissing noise resulting from the mixture of air with the water created by the regurgitation or turbulence.

In order to preclude this regurgitation, extreme agitation or turbulence, the present invention comprehends any suitable type of baffle means which will prevent the direct radial inward flow of water between the diaphragm member 15 and its seat 14 so as to cause the outgoing water to flow in a tortuous path thus avoiding the turbulence, regurgitation or extreme agitation and produce a solid unaerated head of water in the region of the outlet, which has proven in actual practice to muffle or silence the closing noise.

As disclosed in Figs. 1 to 3, inclusive, an inverted cup-shaped element designated generally by the reference character A is employed which includes a flat base portion 40 preferably of circular formation and a continuous depending marginal rim portion 41 at the outer periphery of the base portion. The said base portion 40 is formed with a central aperture 42 of a size to snugly fit over the outlet tube or bushing 19 with the upper flat surface thereof clamped against the central area of the diaphragm member 15 in surrounding relation to the opening 18 by the retaining nut 20. The base portion 40 is of a sufficient diameter or size as to leave on its under surface an endless area or face disposed between the outer periphery of the retaining nut and the inner periphery of the marginal rim which is adapted to be moved into sealing engagement with the valve seat 14 at the upper end of the sleeve 13. The element A may be constructed of any suitable material for the purpose such as molded rubber or a plastic material or the same may be in the form of a metallic housing having an insert of suitable seating material which affords a surface of a character to resist the embedment of small pebbles, grit or other hard foreign particles so that the same will rebound therefrom and eventually be carried through the outlet opening during the flushing operation, thus eliminating frequent repairs which have been required heretofore where hard foreign particles become embedded in the soft leather diaphragm and tend to wear or score the valve seat and prevent full closing or cause leakage when the diaphragm valve is moved to closed position. It will also be observed that by employing the retaining nut 20 to clamp the element A in place, said element when worn may be readily removed and a new one substituted therefor.

The marginal rim 41 of the silencing or muffling element A is of such a height that the same functions as a baffle only when the diaphragm member 15 closely approaches its seat 14 and just prior to the termination of the flushing operation. At this stage, it will be apparent from the position of parts as shown in Fig. 1, that the rim 41 surrounds or embraces the seat 14 so as to cause the outgoing water to travel in a tortuous path, as shown by the arrows, thus preventing the direct radial inward flow of the water between the diaphragm valve member and its seat, thereby eliminating the regurgitation, the extreme turbulence or agitation. This tends to maintain a solid unaerated head of water around the gradually narrowing or constricting outlet to muffle or prevent the closing noise and make for a more silent operation of the flush valve.

In order to provide for clearance for the by-pass fitting, the marginal rim portion 41 and the base of the element A is formed with a notch 43 which in no way affects the baffling function or muffling effect while serving the important addition purpose of an outlet for the escape of pebbles, sand or hard foreign particles in the water thus precluding their being trapped between the seat 14 and base 40 of the element A where they would affect the proper closing of the diaphragm valve member or scoring or other damage to the seating faces.

In the modified adaptation of the invention shown in Fig. 4, the diaphragm valve member designated at 50 is of material such as molded rubber or any equivalent material suitable for the purpose and in this instance the muffling or silencing means consists of a substantially annular bead or rim 51 formed integral with the the diaphragm valve member. Preferably in this form, the said valve member 50 is moulded about a reinforcing element 52 so that the same is embedded therein. In all respects the construction and theory and mode of operation of the flush valve and the muffling or silencing means is identical with the previous form of the invention disclosed.

In the modified form of the invention shown in Fig. 5, the muffling or silencing means consists of an inverted cup-shaped element B which is preferably fashioned of a suitable metal and which includes a base 60 having a central aperture 61 and formed with a marginal rim 62 enclosing an annular washer 63 of suitable seating material adapted to engage with the seat 14 of the sleeve 13. In this instance the element B is clamped in place by a nut 64 corresponding to the nut 20 of the first form but having no depending guide fingers 21. In lieu thereof the diaphragm valve member 15 is guided by means of circumferentially spaced fingers 65 carried by the marginal rim 62 of the element B and depending therefrom and engaging with the outer periphery of the outlet sleeve 13, thereby leaving said outlet tube free and clear of any impediment to the flow of the water during the flushing operation.

What is claimed is:

The combination with a flush valve including a casing having an inlet and an outlet with a valve seat located therebetween and a diaphragm valve member movable into and out of engagement with said seat for controlling the opening and closing of said outlet; of means for muffling the noise incident to the final stages of the closing movement of said valve member with reference to its seat comprising a baffle element carried by and movable with the valve member and so constructed and arranged as to be disposed in surrounding relation to the valve seat as the valve member approaches seating relation thereto, said baffle element being formed with an outlet for the escape of hard foreign particles from within the confines thereof as the valve member approaches its seat, said diaphragm valve and said baffle element having aligned central openings therein, a tube fitted in said openings and secured to said diaphragm in sealing relation therewith and a valve element adapted to close the upper end of said tube and having a stem protruding through said tube and adapted to be moved for displacing said last mentioned valve to permit the passage of the water through said tube to equalize the pressure on the upper surface of the diaphragm valve.

JOHN J. DELANY.

REFERENCES CITED

The following references are of record in the file of this patent:

UNITED STATES PATENTS

| Number | Name | Date |
| --- | --- | --- |
| 1,004,650 | Hilton | Oct. 3, 1911 |
| 1,868,520 | Brooks | July 26, 1932 |
| 2,066,086 | Wilson | Dec. 29, 1936 |
| 2,074,698 | Langdon | Mar. 23, 1937 |

FOREIGN PATENTS

| Number | Country | Date |
| --- | --- | --- |
| 281,211 | Great Britain | Dec. 1, 1927 |